(12) United States Patent
Bohle, II et al.

(10) Patent No.: US 11,548,169 B2
(45) Date of Patent: Jan. 10, 2023

(54) LINKAGE ASSEMBLY FOR ATTACHING A TOOL TO A ROBOTIC DEVICE

(71) Applicant: ATI Industrial Automation, Inc., Apex, NC (US)

(72) Inventors: David John Bohle, II, Durham, NC (US); Laleh Alighanbari Jamshidi, Apex, NC (US); Matthew Wayne Ledford, Fuquay-Varina, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 371 days.

(21) Appl. No.: 16/574,579

(22) Filed: Sep. 18, 2019

(65) Prior Publication Data
US 2021/0078185 A1    Mar. 18, 2021

(51) Int. Cl.
*B25J 15/04*      (2006.01)
*B25J 17/02*      (2006.01)
*B25J 19/02*      (2006.01)

(52) U.S. Cl.
CPC ........... *B25J 15/0408* (2013.01); *B25J 17/02* (2013.01); *B25J 19/02* (2013.01)

(58) Field of Classification Search
CPC ........ B25J 9/1065; B25J 15/0408; B25J 9/16; B25J 15/022; B25J 17/02; B25J 17/00
USPC ......................................................... 74/106
See application file for complete search history.

(56) References Cited

U.S. PATENT DOCUMENTS

| | | | | |
|---|---|---|---|---|
| 4,477,221 A | * | 10/1984 | Sega | B25J 9/148 414/4 |
| 4,728,137 A | * | 3/1988 | Hamed | B25J 15/0266 294/115 |
| 5,592,762 A | * | 1/1997 | Hendron | E02F 3/30 37/403 |
| 5,687,961 A | * | 11/1997 | Horn | B25B 5/122 269/25 |
| 5,816,567 A | * | 10/1998 | Horn | B25B 5/122 269/32 |
| 5,924,325 A | * | 7/1999 | Brucher | C21B 7/12 74/106 |
| 6,095,011 A | | 8/2000 | Brogårdh | |
| 9,855,663 B1 | * | 1/2018 | Strauss | B25J 15/08 |
| 2017/0220825 A1 | | 8/2017 | Wang et al. | |
| 2019/0054615 A1 | | 2/2019 | Ulliman et al. | |

OTHER PUBLICATIONS

Amtru Business AG, "Angle-Grinder Series 200", pp. 1-2, retrieved on Sep. 16, 2019, retrieved from internet: https://www.amtru.com/deburring-fettling-grinding-tool-angle-grinder200.

* cited by examiner

*Primary Examiner* — Jake Cook
(74) *Attorney, Agent, or Firm* — Coats & Bennett, PLLC

(57) ABSTRACT

A linkage assembly to connect a tool to a robotic device. The linkage assembly includes a body and a first linkage pair with first and second links that are configured to be connected to a first section of the tool. The linkage assembly also includes a second linkage pair that includes first and second links that are configured to be connected to a second section of the tool. The first linkage pair are powered to provide a force to move the tool relative to the body. The second linkage pair supports the tool and moves with the first linkage pair. Each of the first and second linkage pairs are pivotally connected to the body and may maintain parallel positioning during the movement.

18 Claims, 8 Drawing Sheets

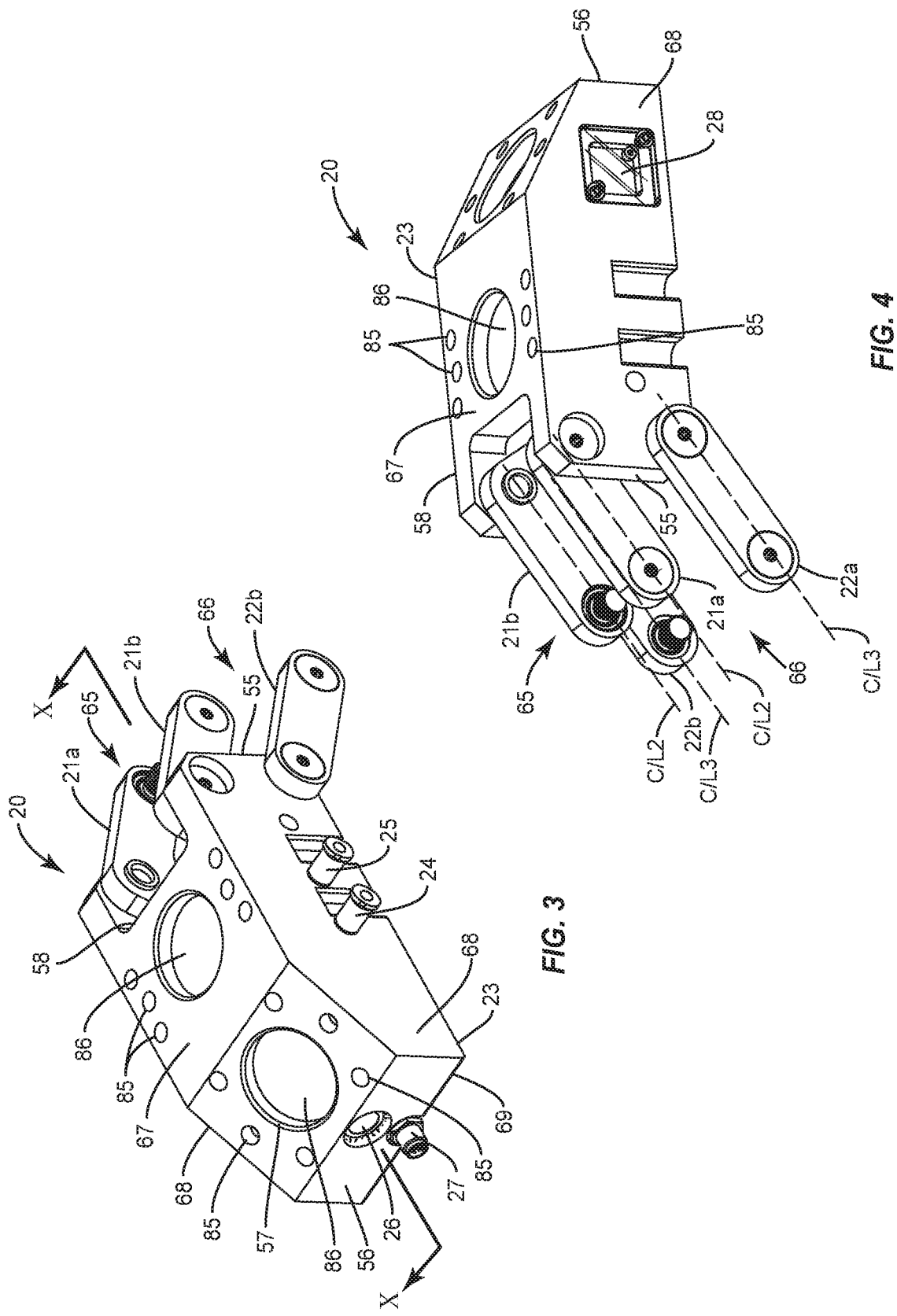

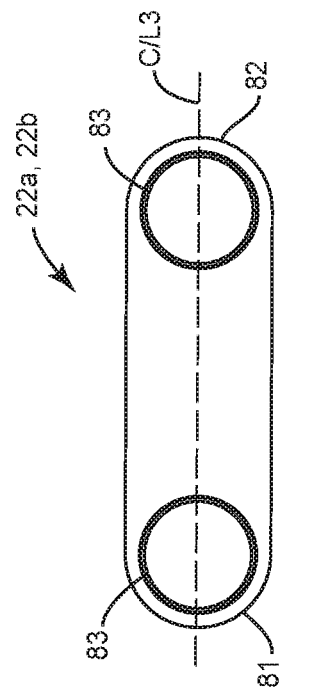
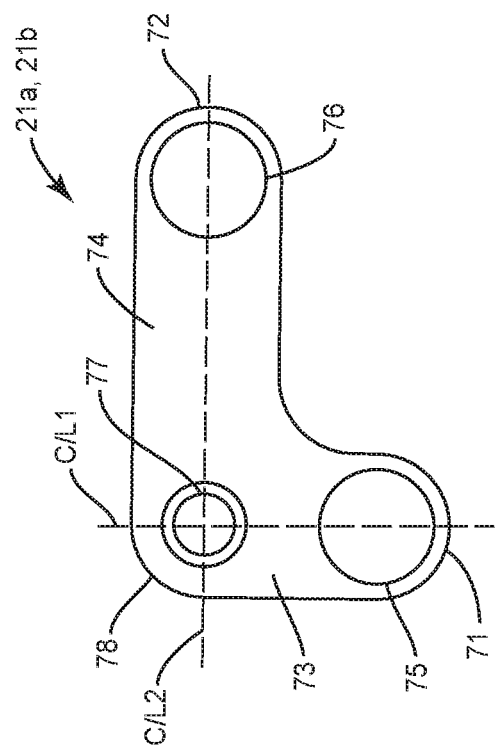
FIG. 6
FIG. 5

LINKAGE ASSEMBLY FOR ATTACHING A TOOL TO A ROBOTIC DEVICE

FIELD OF INVENTION

The present invention relates generally to devices and methods to attach a tool to a robotic device and, more specifically, to a linkage assembly to attach a tool to a robotic device.

BACKGROUND

Robotic devices have become an indispensable part of modern manufacturing. The robotic devices are configured to connect to and operative tools that perform a wide variety of jobs. The robotic devices operate the tools to perform many manufacturing tasks tirelessly, in hostile environments, and with high precision and repeatability.

In many robotic manufacturing applications, it is cost-effective to utilize a relatively generic robot device, such as a robotic arm, to accomplish a variety of tasks. For example, in an automotive manufacturing application, a robot arm may be utilized to connect to and position tools that can cut, grind, or otherwise shape metal parts during one phase of production, and perform a variety of welding tasks in another. Different welding tool geometries may be advantageously mated to a particular robot arm to perform welding tasks at different locations or in different orientations.

The connection should provide for the tool to be positioned at a variety of different positions relative to the robotic device. This can include various vertical orientations, extensions, and retractions as necessary to position the tool to perform the desired task. Further, the connection should provide for a fast response to position commands from the robotic device and/or a remote location to provide for rapid positioning of the tool.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect is directed to a linkage assembly that connects a tool to a robotic device. The linkage assembly comprises a body, a piston movably connected to the body; first links pivotally connected to and spaced apart on the body with the first links operatively connected to the piston to pivot relative to the body during motion of the piston, and second links that are pivotally connected to the body and spaced apart on the body with the second links positioned away from the first links. The piston is movable relative to the body between a first position and a second position. The first position locates the first links at a first orientation that extends the tool away from the body by a first amount. The second position locates the first links at a second orientation that extends the tool away from the body by a different second amount.

In another aspect, each of the first links comprises a first end that is connected to the piston and a second end configured to be connected to the tool.

In another aspect, each of the first links comprises a right-angle shape with a first straight section that includes the first end that is connected to the piston and a second straight section that includes the second end that is configured to be connected to the tool with the first straight section and the second straight section being substantially perpendicular.

In another aspect, each of the first links comprises an elbow at the intersection of the first and second sections with the elbow of each of the first links being connected to the body.

In another aspect, the body extends around and forms an interior space with the piston positioned within the interior space.

In another aspect, a rocker arm is pivotally connected to each of the piston and the first links with the rocker arm positioned to connect the piston to the first links.

In another aspect, a sensor is attached to the body and a target is attached to the piston with the sensor configured to measure a position of the target.

In another aspect, a chamber is positioned within an interior of the body with the piston extending through the chamber and with a first port in the body leading into a first section of the chamber to receive fluid to move the piston to the first position and with a second port in the body leading into a second section of the chamber to receive the fluid to move the piston to the second position.

In another aspect, the first links comprise a different shape than the second links.

In another aspect, a section of the first links that extend outward from the body are parallel to a section of the second links that extend outward from the body.

One aspect is directed to a linkage assembly that connects a tool to a robotic device. The linkage assembly comprises a body and a piston movably connected to the body. A first linkage pair comprises right-angle links with first and second ends and an intermediate elbow. The first ends are operatively connected to the piston and the elbow is pivotally connected to the body with the second ends positioned outward from the body to be connected to the tool. A second linkage pair comprises second links with first ends pivotally connected to the body and second ends positioned outward from the body to be connected to the tool. The piston is movable relative to the body between a first position and a second position to selectively position the first linkage pair at different angular orientations relative to the body.

In another aspect, a sensor is positioned on the body to sense the piston and a controller with a control circuit is configured to receive signals from the sensor to calculate a vertical orientation of the first linkage pair relative to the body.

In another aspect, each of the right-angle links are identical in shape and size.

In another aspect, sections of the first linkage pair that extend outward from the body are parallel to sections of the second linkage pair that extend outward from the body.

One aspect is directed to a method of positioning a tool relative to a robotic device comprising: while a body of a linkage assembly is connected to the robotic device, positioning the tool at a first position relative to the body by moving a piston of the linkage assembly to a first position relative to the body and thereby pivoting a first linkage pair that is operatively connected to the piston and to the tool to a first vertical position; positioning the tool at a second position relative to the body by moving the piston to a second position relative to the body and thereby pivoting the second linkage pair to a different second vertical position relative to the body; and supporting the tool with a second linkage pair while moving the piston between the first and second positions.

In another aspect, the method further comprises pivoting each of a pair of first links of the first linkage pair about an elbow that is positioned between a first end that is operatively connected to the piston and a second end that is connected to the tool.

In another aspect, the method further comprises inputting fluid into a first section of a chamber in the body of the linkage assembly and moving the piston to the first position and inputting the fluid into a second section of the chamber and moving the piston to the second position.

In another aspect, the method further comprises measuring a position of the piston within the body and calculating the position of the first linkage pair and the position of the tool relative to the body.

In another aspect, the method further comprises maintaining sections of the first and second linkage pairs parallel while moving the piston between the first and second positions.

In another aspect, the method further comprises supporting the tool with a second linkage pair that is parallel with the first linkage pair while moving the piston between the first and second positions.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 3 is a perspective rear view of a linkage assembly.

FIG. 4 is a perspective front view of the linkage assembly of FIG. 3

FIG. 5 is a plan view of a first link.

FIG. 6 is a plan review of a second link.

DETAILED DESCRIPTION

Figure 1:
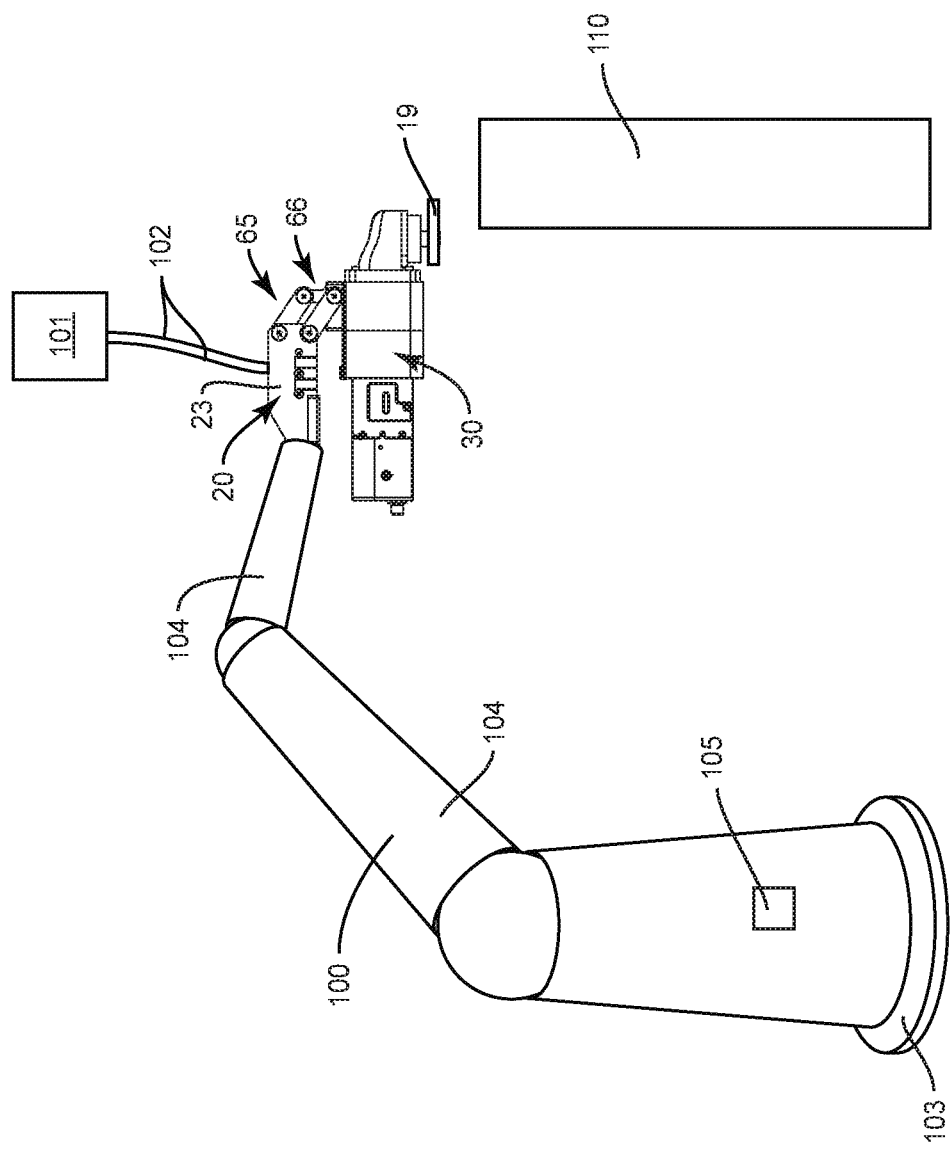
FIG. 1 is a schematic diagram of a linkage assembly that connects a tool to a robotic device.

FIG. 1 illustrates a linkage assembly 20 configured to attach a tool 30 to a robotic device 100. The linkage assembly 20 includes a body 23 configured to be attached to the robotic device 100. The linkage assembly 20 also includes first and second linkage pairs 65, 66 configured to be attached to the tool 30. The first and second linkage pairs 65, 66 provide for supporting and positioning the tool 30. In one example, this positioning provides for a cutting head 19 on the tool 30 to contact against and work on a work piece 110.

The robotic device 100 is configured to move and position the linkage member 20 and tool 30. The robotic device 100 can include an articulated arm that is movable within number degrees of freedom. The robotic device 100 can include a base 103 and an arm assembly with one or more movable arm sections 104. Each arm section 104 can include a movable joint to provide for pivoting and/or rotating movement. In one example, the base 103 is fixed to a support floor and the arm assembly is configured to rotate about the base 103. In another example, the base 103 is movable about a support floor.

The robotic device 100 includes a controller 105 to control the operation. The controller 105 can include one or more processing circuits with one or more microprocessors, microcontrollers, ASICs, or other programmable devices configured with appropriate software and/or firmware to control the overall operation of the robotic device 100 according to program instructions stored in a memory circuit. The memory circuit stores processing logic, programming code, and operational information for use by the processing circuit. The memory circuit can include both volatile and non-volatile memory, for example. The controller 105 can include a communication interface for communicating with an outside source, such as a system controller. The communication interface can also provide for communications with the linkage member 20 and/or tool 30. The communication interface can provide for wired connections and/or short-range wireless interface (such as a BLUETOOTH interface, USB, RFID, ZIGBEE, or WIFI interface) and/or a long range cellular phone or satellite communications interface.

The controller 105 controls the operation of the robotic device 100. In one example, the controller also controls the operation of one or more of the linkage assembly 20 and/or the tool 30.

Figure 2:
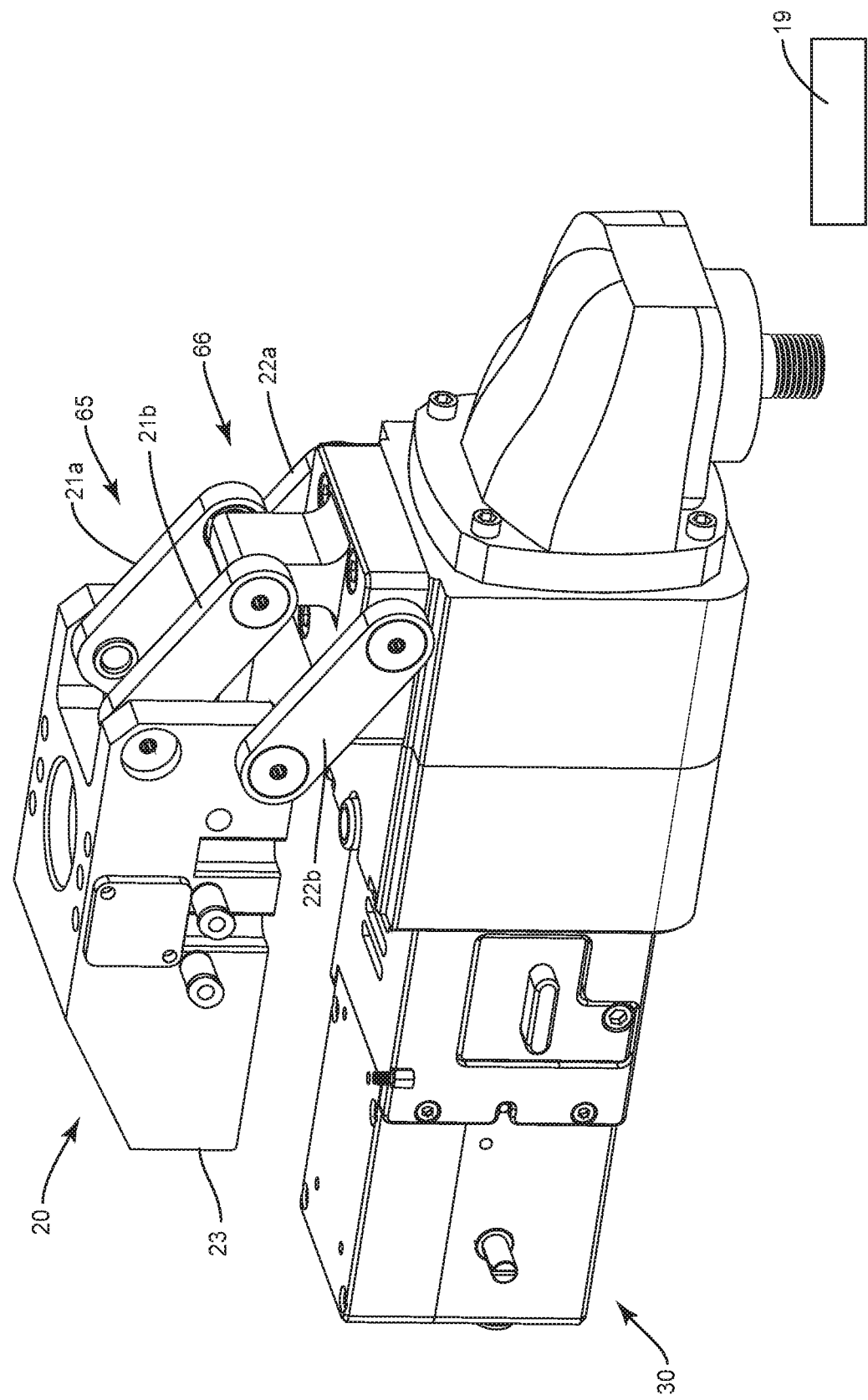
FIG. 2 is a perspective view of a linkage assembly connected to a tool.

FIG. 2 illustrates a linkage assembly 20 connected to a tool 30. The linkage assembly 20 includes a body 23 and a first linkage pair 65 with first and second links 21a, 21b that are configured to be connected to a first section of the tool 30. The linkage assembly 20 also includes a second linkage pair 66 that includes first and second links 22a, 22b that are configured to be connected to a second section of the tool 30. The first linkage pair 65 are powered to provide a force to move the tool 30 relative to the body 23. The second linkage pair 66 supports the tool 30 and moves with the first linkage pair 65. Each of the first and second linkage pairs 65, 66 are pivotally connected to the body 23 and can maintain parallel positioning during the movement.

As illustrated in FIGS. 3 and 4, the body 23 is configured to be connected to the robotic device 100. In one example, the body 23 includes apertures 85 sized to receive fasteners to connect with the robotic device 100. One or more recesses 86 can be positioned to further engage with an extension on the robotic device 100.

The body 23 includes a top 67, lateral sides 68, bottom 69, front side 55, and rear side 56. The top side 67 can include a first section at the front side 55, and an angled down section 57 at the rear side 56. The angled down section 57 lessens the movement of the robotic device 100 by reducing the motion on a final axis of a wrist of the robotic device 100. This reduction in motion saves time and energy during movement of the robotic device 100 in positioning the tool 30. In one example, the lateral sides 68 are parallel. In another example, the lateral sides 68 are non-parallel.

The first and second linkage pairs 65, 66 are connected at the front side 55 of the body 23. The first linkage pair 65 is mounted to the body 23 at a recess 58 that extends into the top side 67 and the front side 55 of the body 23. In one example, the first linkage pair 65 is connected along a wall of the recess 58 that is parallel to the lateral sides 68 of the body 23. The second linkage pair 66 is connected to an outside of the lateral sides 68 of the body 23. Fluid ports 24, 25 extend into one of the lateral sides 68. A vent 26 extends into the rear side 56 to provide for air movement with the interior of the body 23. An I/O port 27, such as a pin connector, provides for a data connection with the robotic device 100 and/or other remote source. An electronic display 28 provides for displaying information to a user.

As illustrated in FIG. 5, the first links 21a, 21b have a right angle shape with a first section 73 and a second section 74. The first links 21a, 21b include ends 71, 72 and an elbow 78. Apertures 75, 76 are positioned on each of the sections 73, 74, at the respective ends 71, 72 and with a central aperture 77 at the elbow 78. The first section 73 includes a straight centerline C/L1 that extends through apertures 75, 77. The second section 74 includes a straight centerline C/L2 that extends through apertures 76, 77. The centerlines C/L1, C/L2 are aligned at a right angle. In other examples, the angle is within a range of between 80 degrees-100 degrees. In one example, each of the first links 21a, 21b includes the same shape and size. In another example, the first links 21a, 21b include different shapes and/or sizes.

FIG. 6 illustrates the second links 22a, 22b. The second links 22a, 22b include a straight shape with opposing ends 81, 82. A straight centerline C/L3 extends through apertures 83, 84 that are positioned at the respective ends 81, 82. In one example, each of the second links 22a, 22b include the same shape and size. In another example, the second links 22a, 22b include different shapes and/or sizes.

Figure 7:
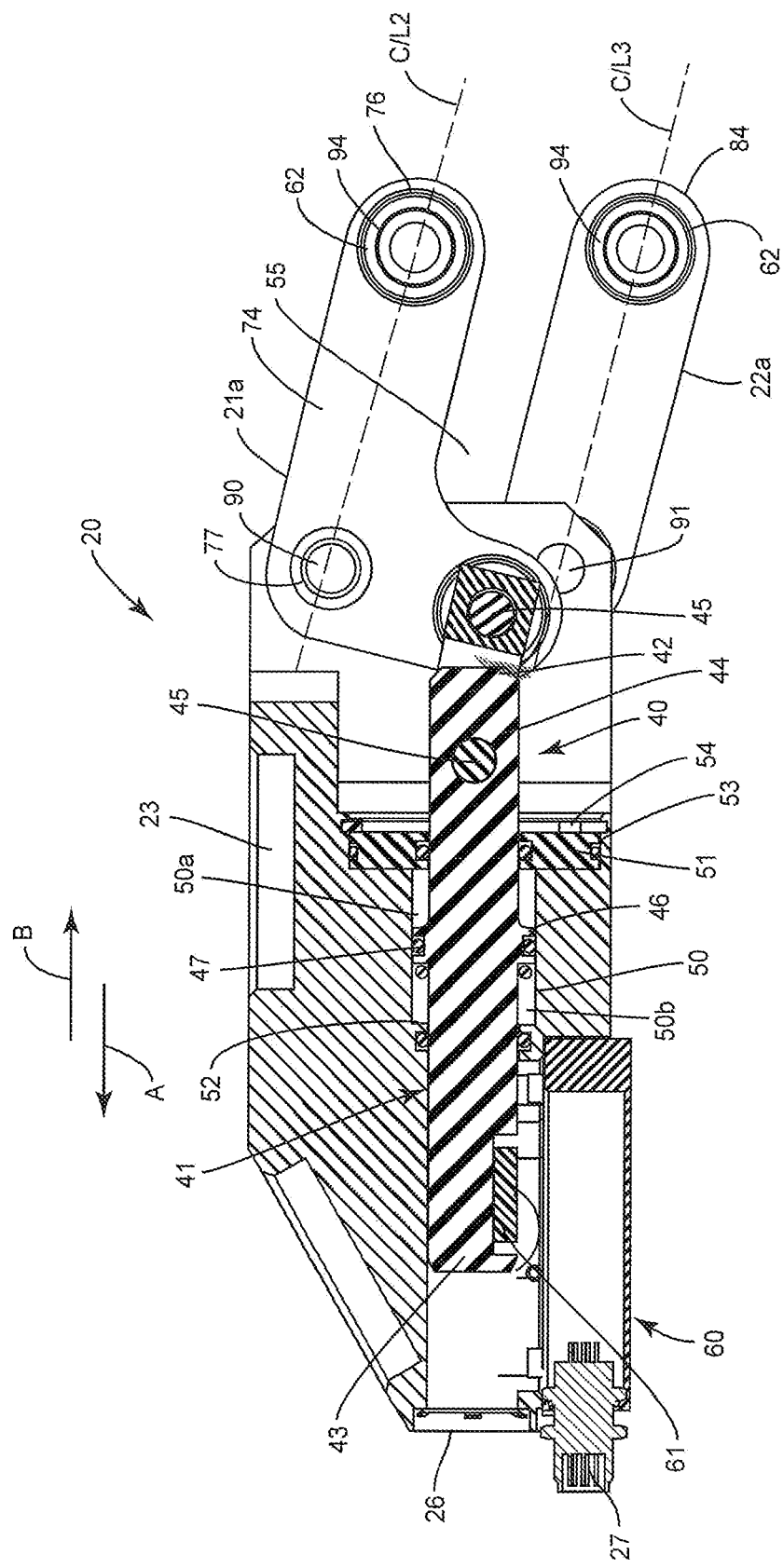
FIG. 7 is a schematic section view of linkage assembly of FIG. 3 cut along line X-X.

FIG. 7 illustrates a schematic section view of the linkage assembly 20 with first and second links 21a, 22a connected to the body 23. The first link 21a is connected to the body 23 by a connector 90 that extends through aperture 77. The second link 22a is connected to the body 23 by a connector 91 that extends through aperture 83 (not visible in FIG. 7). The connectors 90, 91 provide for the links 21a, 22a to be pivotally connected to the body 23. Fasteners 90, 91 can have various configurations, including but not limited to a bolt and nut assembly, rivet, and screw. The links 21a, 22a are sized to extend outward beyond the body 23 to connect with the tool 30. Sealed bearings 62 and snap rings 94 are mounted in the apertures 76 of each of the first links 21a, 21b and apertures 84 of each of the second links 22a, 22b. The first and second links 21a, 22a are parallel to one another. That is, the centerline C/L2 of the second section 74 of the first link 21a is parallel to the centerline C/L3 of the second link 22a. During movement, the links 21a, 22a maintain their parallel positioning.

FIG. 7 illustrates first and second links 21a, 22a connected to the body 23 of the linkage assembly 20. The opposing first and second links 21b, 22b are connected to the body 23 in a similar manner. The first and second links 21b, 22b are parallel and maintain their parallel positioning during movement.

A movement assembly 40 is attached to each of the first links 21a, 21b. The movement assembly 40 includes a piston 41 and a rocker arm 42 that are each movable relative to the body 23. The piston 41 includes an elongated shape with a first end 43 and a second end 44. The second end 44 is connected to the rocker arm 42 which in turn is connected at the apertures 75 of each of the first links 21a, 21b. Fasteners 45 connect the piston 41 to the rocker arm 42, and the rocker arm 42 to the first links 21a, 21b. In another example, the piston 41 is directly connected to the first links 21a, 21b.

The piston 41 extends through a chamber 50 in the body 23. A seal 47, such as an o-ring, can extend around the piston 41 and be positioned in the chamber 50. The piston 41 can include one or more flanges 46 that position the seal 47. The seal 47 is sized to contact against a wall of the chamber 50. The seal 47 divides the chamber 50 into a first section 50a positioned between the seal 47 and a first end 51 of the chamber 50, and a second section 50b positioned between the seal 47 and a second end of the chamber 50. The port 24 (see FIG. 3) extends through the body 23 and into the second section 50b, and port 25 extend through the body 23 and into the first section 50a. Fluid, such as pressurized air, can be introduced and removed from the sections 50a, 50b to control the movement of the piston 41 and thus the first linkage pair 65.

A sealing plate 53 and a snap ring 54 are attached to the body 23 at the first end 51 of the chamber 50. These components position and secure the piston 41 within the body 23. Each of the sealing plate 53 and snap ring 54 include an opening to allow for the piston 41 to pass through and to move in forward and rearward directions. One or more seals, such as o-rings, can be positioned along the chamber 50 to seal the fluid. FIG. 7 includes seals positioned at each of the ends 51, 52, and along the piston 41 within the interior of the chamber 50. Other examples include seals positioned at various locations.

A sensor 60 is positioned in the body 23 to measure a position of the piston 41 within the chamber 50. The sensor 60 can include a variety of configurations. Examples include an indicative position sensor, hall effect sensor capacitive displacement sensor, potentiometer, and linear encoder. In one example, the sensor 60 can sense a target 61 on the piston 41. The target 61 can be constructed from a variety of materials, such as but not limited to a magnet or metal.

During use, a fluid is input through the port 25 and into the first chamber section 50a. Concurrently, fluid within the second chamber section 50b can exit through port 24. This movement of the fluid causes the piston 41 to move in the direction of arrow A in FIG. 7. This movement in turn causes the first link 21a and the second link 21b that are both attached to the piston 41 to pivot about their respective connectors 90 and thus reposition the attached tool 30. The second links 22a, 22b are also pivoted in the same direction due to their attachment with the tool 30. The second links 22a, 22b are not powered by the piston 41 and merely follow along with the movement due to their attachment to the tool 30.

Fluid can also be input through port 24 and into the second chamber section 50b. Concurrently, fluid within the first chamber section 50a can exit through port 25. This fluid movement causes the piston 41 to move in the chamber 50 in the opposing direction indicated by arrow B. This causes the first and second links 21a, 21b to pivot about their respective connectors 90 and thus move the position of the attached tool 30. The second links 22a, 22b also pivot due to their attachment with the tool 30. In the various positions, the links 21a, 21b, 22a, 22b are sized to extend outward beyond the front 55 of the body 23.

The sensor 60 is configured to measure the target 61 during the movement of the piston 41. The position is then used to determine the vertical position of the first and second linkage pairs 65, 66 and thus the position of the attached tool 30. The display 28 (see FIG. 4) indicates to the user the vertical position. In one example, the display 28 includes a number of different LEDs that each have a different color. The different LEDs are illuminated based on the vertical position.

As illustrated in FIG. 2, the first and second linkage pairs 65, 66 are each connected to both of the body 23 of the linkage assembly 20 and the tool 30. The first and second linkage pairs 65, 66 provide for movement of the tool 30 relative to the linkage assembly 20. During movement of the piston 41, each of the first links 21a, 21b are driven to move the tool 30 relative to the linkage assembly 20.

The first linkage pair 65 experiences the same movement and relative positioning. As illustrated in FIGS. 3 and 4, each of the first links 21a, 21b are positioned at the same vertical position relative to the body 23. Further, during movement of the first linkage pair 65, the first links 21a, 21b rotate the same amount about their respective aperture 77. Likewise, the second links 22a, 22b experience the same movement and relative positioning. Each of the second links 22a, 22b is positioned at the same vertical position relative to the body 23, and rotate the same amount about their respective apertures 83.

The first and second linkage pairs 65, 66 have a parallel configuration. As illustrated in FIG. 4, the first link 21a and second link 22a on one lateral side 68 of the linkage assembly 20 have a parallel configuration. The centerline C/L2 of the first link 21a is parallel to the centerline C/L3 of the second link 22a during the various movements. Likewise, the centerlines C/L2, C/L3 of the links 21b, 22b on the second lateral side 68 of the linkage assembly 20 also has a parallel design. The centerline C/L2 of the first link 21b is parallel to the centerline C/L3 of the second link 22b during the various movements.

Figure 8:
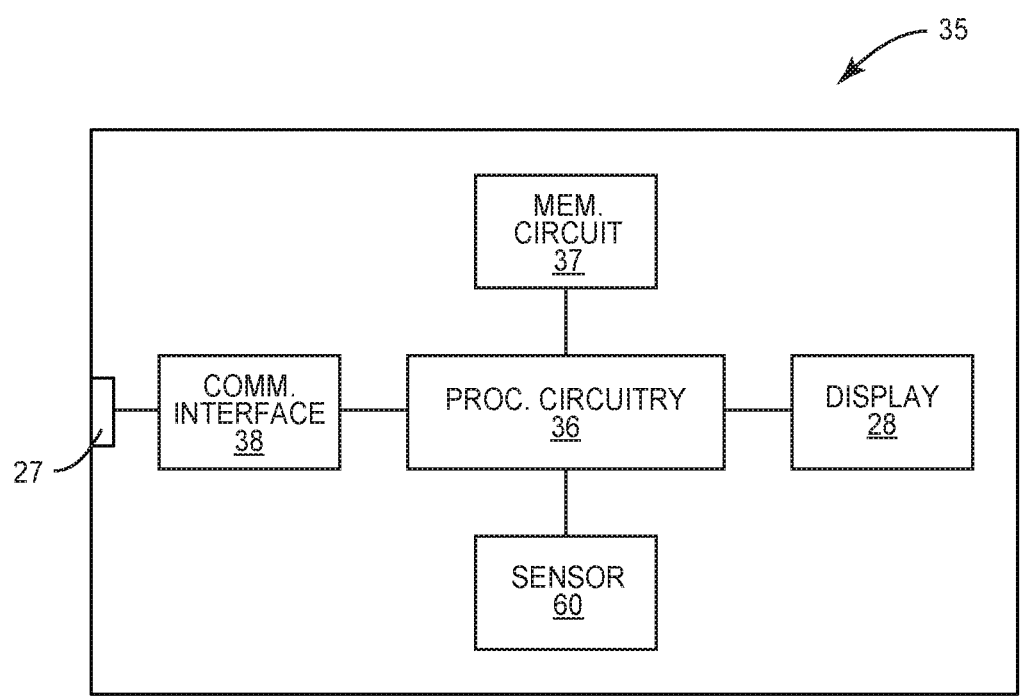
FIG. 8 is a schematic diagram of a controller.

A controller 35 oversees the operation of the linkage assembly 20. In one example, the controller 35 is positioned within the interior of the body 23. As illustrated in FIG. 8, the controller 35 includes a processing circuit 36 with one or more microprocessors, microcontrollers, ASICs, or other programmable devices configured with appropriate software and/or firmware to control the overall operation of the linkage assembly 20 according to program instructions stored in a memory circuit 37. The memory circuit 37 stores processing logic, programming code, and operational information for use by the processing circuit 36. The memory circuit 37 can include both volatile and non-volatile memory, for example.

The processing circuit 36 receives signals from the sensor 60. Based on the signals, the processing circuit 36 determines the position of the piston 41 within the chamber 50 and thus the vertical position of the first linkage pair 65 and/or second linkage pair 66. The display 28 provides for outputting the position of the piston 41 and/or vertical position of the first and second linkage pairs 65, 66. In one example, display 28 includes three light-emitting diodes (LEDs) or LCD to indicate the position of the piston 41 between a full range of travel.

A communication interface 38 provides for communications with the controller 105 of the robotic device 100 and/or a remote source (e.g., a system controller). The communication interface 38 can include the I/O port 27 for wired communication connection. In one embodiment, the I/O port 27 is a micro USB port. The communication interface 38 may also include a short-range wireless interface, such as a BLUETOOTH interface, USB, RFID, ZIGBEE, or WIFI interface, a long range cellular phone or satellite communications interface. There may be more than one communications interface 38. An antenna (not illustrated) may be configured for transmitting and receiving wireless signals to and from remote sources.

The linkage assembly 20 can receive power from the robotic device 100 or remote source through a power connector. Alternatively or additionally, the controller 35 can include a separate power source such as a battery for powering one or more of the various components.

During use, signals regarding the position of the piston 41 and thus the vertical position of the first and second linkage pairs 65, 66 are sent from the controller 35 to the controller 105 of the robotic device 100 and/or a remote source. The robotic device 100 or remote source is configured to receive the signals and determine the position of the tool 30. The robotic device 100 and/or remote source can further control the movement of fluid from a fluid supply 101 through lines 102 (see FIG. 1) and into and out of the chamber 50 to control the movement of the piston 41 and thus the position of the tool 30.

In another example, the processing circuit 36 determines the vertical position of at least one of first and second linkage pairs 65, 66. This vertical position is then signaled to the robotic device 100 and/or remote source.

The linkage assembly 20 can be used to position a variety of different tools 30 relative to the robotic device 100.

Figure 9:
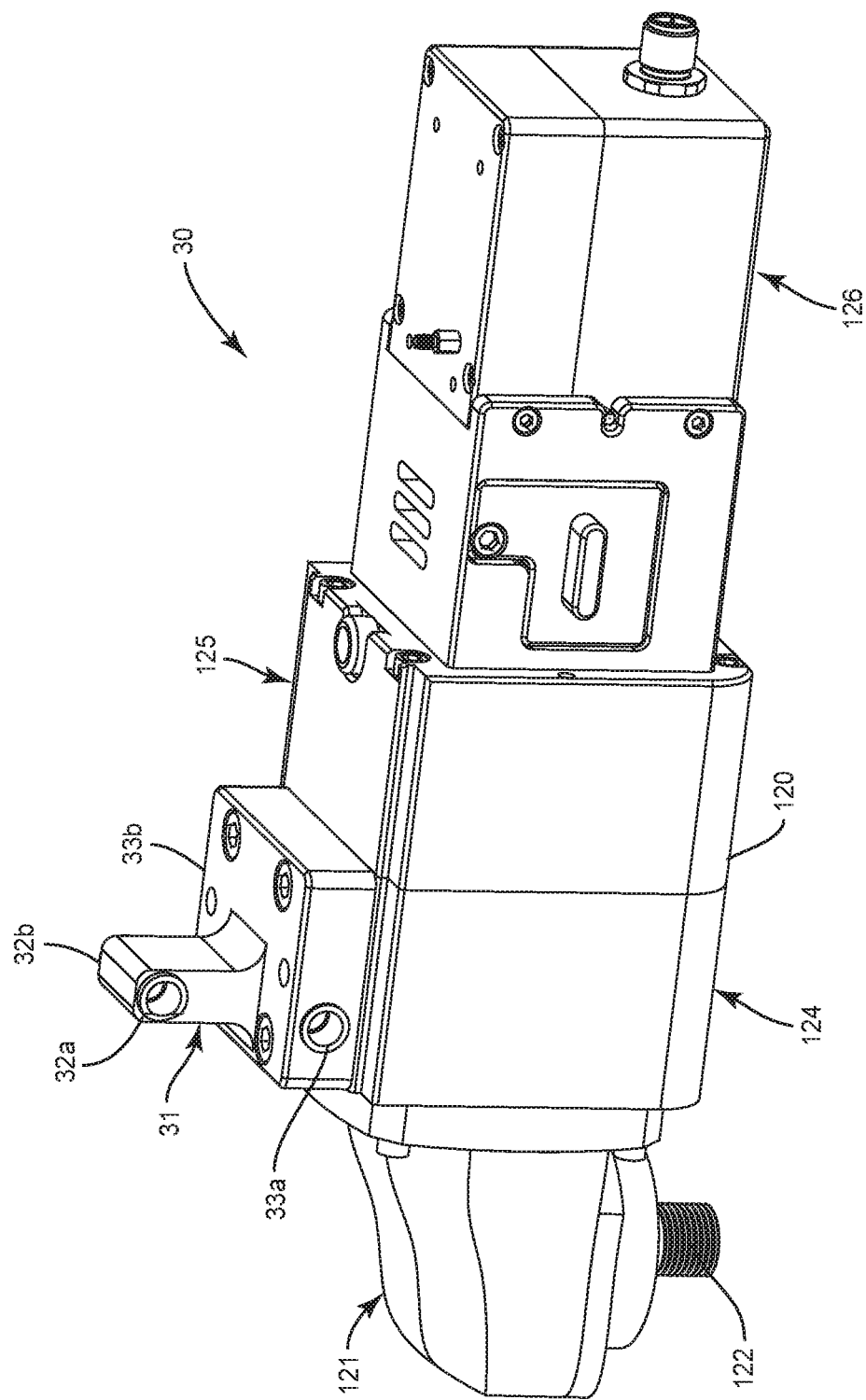
FIG. 9 is a perspective view of a tool.

FIG. 9 illustrates a tool 30 that is configured to connect to the linkage assembly 20. The tool 30 includes a linkage connector 31 for connecting with the first and second linkage pairs 65, 66. Specifically, the linkage connector 31 includes a pair of receptacles 32a, 32b that receive the first links 21a, 21b respectively. A second pair of receptacles 33a, 33b receives the second links 22a, 22b.

The tool 30 includes an outer housing 120 that extends around and forms an interior space 123. The linkage connector 31 is attached to and extends outward from the outer housing 120. The outer housing 120 can have a single, unitary construction, or can be constructed from multiple different sections that connect together. In one example, the outer housing 120 includes a main housing 124, a motor housing 125, and an electronics housing 126. These different housings 124, 125, 126 are connected together to extend around and form the interior space 123.

The interior space 123 is sized and configured to contain a power tool. A gearhead 121 extends from one end of the outer housing 120 and includes an output shaft 122 that receives the cutting head 19. A variety of power tools and gearheads are applicable, such as but not limited to angle grinders, die grinders, drills, sanders, filers, and various other tools. In one example, these tools are available from DEWALT Stanley Black & Decker and Robert Bosch GmbH.

Figure 10:
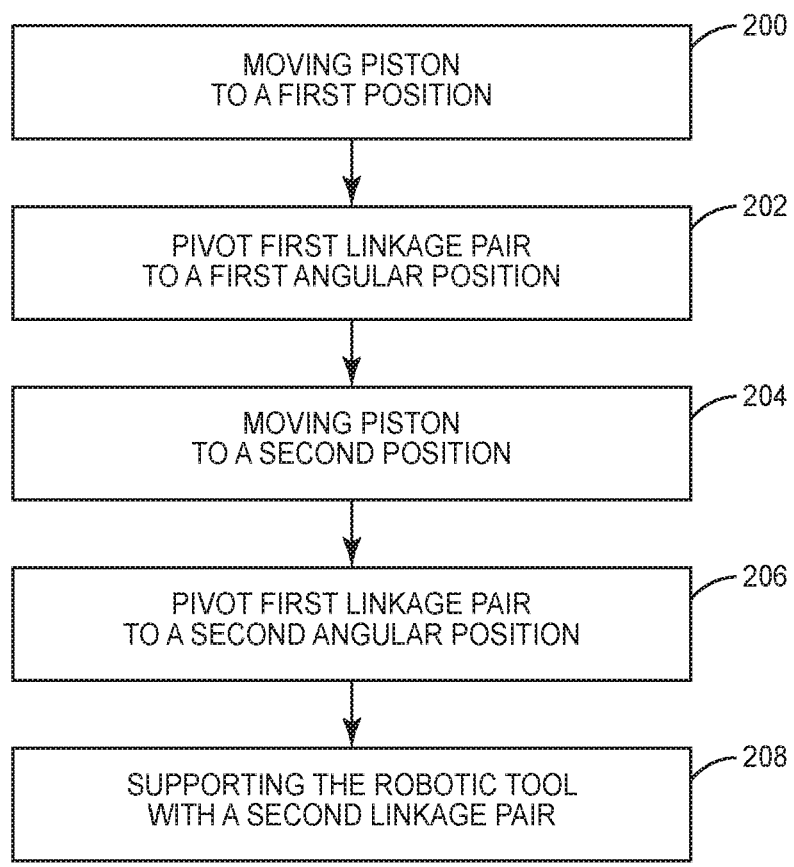
FIG. 10 is a flowchart diagram of a method of positioning a tool with a linkage assembly.

FIG. 10 illustrates a method of positioning a tool 30 relative to a robotic device 100. In this method, the body 23 of the linkage assembly 20 is connected to the robotic device 100. The method includes positioning the tool 30 at a first position relative to the body 23 by moving the piston 41 of the linkage assembly 20 to a first position (block 200). This movement causes pivoting to a first vertical position of the first linkage pair 65 that is operatively connected to the piston 41 and to the tool 30 (block 202). The tool 30 is moved to a second position relative to the body 23 by moving the piston 41 to a second position (block 204). This movement causes pivoting of the second linkage pair 65 to a different second vertical position relative to the body 23 (block 206). During the movement, the second linkage pair 66 supports the tool 30 with the second linkage pair 66 being parallel with the first linkage pair 65 (block 208).

During operation, the tool 30 can be activated prior to being positioned by the linkage assembly 20. Power is supplied to the tool 30 from the robotic device 100 and/or remote source. Once the tool 30 is activated, the linkage assembly 20 can position the tool 30 and bring the cutting head 19 into contact with the workpiece 110. In another example, the linkage assembly 20 initially positions the tool 30 prior to activation of the tool 30 and rotation of the cutting head 19.

For simplicity and illustrative purposes, the present invention is described by referring mainly to an exemplary embodiment thereof. Numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A linkage assembly that connects a tool to a robotic device, the linkage assembly comprising:
   a body;
   a piston movably connected to the body;
   first links pivotally connected to and spaced apart on the body, the first links further operatively connected to the piston to pivot relative to the body during motion of the piston, wherein each of the first links comprises a first end configured to be connected to the piston and a second end configured to be connected to the tool;
   second links that are pivotally connected to the body and spaced apart on the body, the second links positioned away from the first links;
   the piston movable relative to the body between a first position and a second position;
   the first position locating the first links at a first orientation that extends the tool away from the body by a first amount; and
   the second position locating the first links at a second orientation that extends the tool away from the body by a different second amount.

2. The linkage assembly of claim 1, wherein each of the first links comprises a right-angle shape with a first straight section that includes the first end that is connected to the piston, and a second straight section that includes the second end that is configured to be connected to the tool, the first straight section and the second straight section being substantially perpendicular.

3. The linkage assembly of claim 2, wherein each of the first links comprises an elbow at the intersection of the first and second sections with the elbow of each of the first links being connected to the body.

4. The linkage assembly of claim 1, wherein the body extends around and forms an interior space with the piston positioned within the interior space.

5. The linkage assembly of claim 1, further comprising a rocker arm that is pivotally connected to each of the piston and the first links, the rocker arm positioned to connect the piston to the first links.

6. The linkage assembly of claim 1, further comprising a sensor attached to the body and a target attached to the piston, the sensor configured to measure a position of the target.

7. The linkage assembly of claim 1, further comprising a chamber positioned within an interior of the body with the piston extending through the chamber and with a first port in the body leading into a first section of the chamber to receive fluid to move the piston to the first position and with a second port in the body leading into a second section of the chamber to receive the fluid to move the piston to the second position.

8. The linkage assembly of claim 1, wherein the first links comprise a different shape than the second links.

9. The linkage assembly of claim 1, wherein a section of the first links that extend outward from the body are parallel to a section of the second links that extend outward from the body.

10. A linkage assembly that connects a tool to a robotic device, the linkage assembly comprising:
    a body;
    a piston movably connected to the body;
    a first linkage pair comprising right-angle links with first and second ends and an intermediate elbow, the first ends operatively connected to the piston and the elbow pivotally connected to the body with the second ends positioned outward from the body to be connected to the tool;
    a second linkage pair comprising second links with first ends pivotally connected to the body and second ends positioned outward from the body to be connected to the tool;
    the piston movable relative to the body between a first position and a second position to selectively position the first linkage pair at different angular orientations relative to the body.

11. The linkage assembly of claim 10, further comprising:
    a sensor positioned on the body to sense a target on the piston to determine a position of the piston relative to the body; and
    a controller with a control circuit configured to receive signals from the sensor to calculate a vertical orientation of the first linkage pair relative to the body.

12. The linkage assembly of claim 10, wherein each of the right-angle links are identical in shape and size.

13. The linkage assembly of claim 10, wherein sections of the first linkage pair that extend outward from the body are parallel to sections of the second linkage pair that extend outward from the body.

14. A linkage assembly that connects a tool to a robotic device, the linkage assembly comprising:
    a body;
    a piston movably connected to the body;
    a first linkage pair comprising right-angle links with first and second ends and an intermediate elbow, the first ends operatively connected to the piston and the elbow pivotally connected to the body with the second ends positioned outward from the body to be connected to the tool;
    a second linkage pair comprising second links with first ends pivotally connected to the body and second ends positioned outward from the body to be connected to the tool;

a sensor positioned on the body to sense the piston;
a controller with a control circuit configured to receive signals from the sensor to calculate a vertical orientation of the first linkage pair relative to the body; and
the piston movable relative to the body between a first position and a second position to selectively position the first linkage pair at different angular orientations relative to the body.

15. The linkage assembly of claim 1, wherein first ones of the first and second links are paired on a common side of the body and with centerlines of the first ones of the first and second links configured to be parallel during movement between the first position and the second position.

16. The linkage assembly of claim 1, wherein the second links are positioned laterally outward relative to the body from the first links.

17. The linkage assembly of claim 1, wherein the first links are connected to the body at first connection points and the second links are connected to the body at second connection points and with the first connection points above the second connection points on the body.

18. The linkage assembly of claim 10, wherein the second linkage pair are positioned laterally outward on the body from the first linkage pair.

* * * * *